United States Patent
Chhodavdia et al.

(10) Patent No.: US 10,241,958 B2
(45) Date of Patent: Mar. 26, 2019

(54) CONFIGURABLE SYNCHRONIZED PROCESSING OF MULTIPLE OPERATIONS

(71) Applicant: Microsoft Corporation, Redmond, WA (US)

(72) Inventors: Avdhesh Chhodavdia, Fremont, CA (US); Michael S. Fenton, Palo Alto, CA (US); Sheethal Somesh Nayak, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 848 days.

(21) Appl. No.: 14/473,541

(22) Filed: Aug. 29, 2014

(65) Prior Publication Data

US 2016/0062945 A1  Mar. 3, 2016

(51) Int. Cl.
  G06F 15/78  (2006.01)
  G06F 9/52  (2006.01)

(52) U.S. Cl.
  CPC ............ G06F 15/7867 (2013.01); G06F 9/52 (2013.01)

(58) Field of Classification Search
  CPC .................................. G06G 9/52; G06G 9/546
  See application file for complete search history.

(56) References Cited

U.S. PATENT DOCUMENTS

| | | | |
|---|---|---|---|
| 6,101,229 A | 8/2000 | Glover | |
| 6,782,355 B1 * | 8/2004 | Cook | G06F 17/5027 703/14 |
| 7,500,087 B2 | 3/2009 | Saha | |
| 7,526,634 B1 | 4/2009 | Duluk, Jr. et al. | |
| 8,412,889 B2 | 4/2013 | Harper et al. | |
| 8,607,088 B2 | 12/2013 | Swoboda | |
| 8,621,109 B2 | 12/2013 | Matesan | |
| 8,627,132 B2 | 1/2014 | Jurgilewicz et al. | |
| 2003/0135675 A1 | 7/2003 | Pontius et al. | |
| 2004/0174909 A1 | 9/2004 | Marais et al. | |
| 2010/0088483 A1 * | 4/2010 | Lovett | G06F 13/1689 711/167 |

(Continued)

FOREIGN PATENT DOCUMENTS

| EP | 2161921 A1 | 3/2010 |
|---|---|---|
| WO | 2007006013 A2 | 1/2007 |

OTHER PUBLICATIONS

International Searching Authority, U.S. Patent and Trademark Office, International Search Report for PCT/US2015/046195, dated Nov. 13, 2015, 5 pages.

(Continued)

*Primary Examiner* — Zahid Choudhury
(74) *Attorney, Agent, or Firm* — Holzer Patel Drennan (57) ABSTRACT

A system includes operational circuit blocks associated with configurable counter circuits. A configurable counter circuit is configured to control event signal when counting expires and includes a mode input configured to receive a setting of a programmable control event asynchronous mode and a programmable control event synchronous mode. Depending on the programmed mode and whether a control event has occurred in a previous synchronization period, the configurable counter circuit processes an associated operation responsive to issuance of a synchronization instruction or to issuance of a subsequent control event.

19 Claims, 7 Drawing Sheets

(56) References Cited

U.S. PATENT DOCUMENTS

2011/0087860 A1* 4/2011 Nickolls ............... G06F 9/522
                                                  712/22
2013/0080816 A1  3/2013 Johnson et al.
2014/0003564 A1  1/2014 Kammaje
2014/0282566 A1* 9/2014 Lindholm ............. G06F 9/522
                                                  718/102

OTHER PUBLICATIONS

International Searching Authority, U.S. Patent and Trademark Office, Written Opinion for PCT/US2015/046195, dated Nov. 25, 2015, 5 pages.
"Synchronization Objects", Published on: Oct. 13, 2011, Available at: http://msdn.microsoft.com/en-us/library/windows/desktop/ms686364%28v=vs.85%29.aspx.
"Interprocess Synchronization", Published on: Oct. 13, 2011, Available at: http://msdn.microsoft.com/en-us/library/windows/desktop/ms684123%28v=vs.85%29.aspx.
International Searching Authority, (Revised)—U.S. Patent and Trademark Office, International Search Report for PCT/US2015/046195, dated Jan. 13, 2016, 5 pages.
International Searching Authority, (Revised)—U.S. Patent and Trademark Office, Written Opinion for PCT/US2015/046195, dated Jan. 19, 2016, 5 pages.
"International Preliminary Report on Patentability Issued in PCT Application No. PCT/US2015/046195", dated Dec. 15, 2016, 6 Pages.
"Second Written Opinion Issued in PCT Application No. PCT/US2015/046195", dated Sep. 29, 2016, 5 Pages.
"Timer1 Gate" by Microchip Technology, Inc.; Available at: http://microchipdeveloper.com/8bit:timer1gate; (4 pages).

* cited by examiner

CONFIGURABLE SYNCHRONIZED PROCESSING OF MULTIPLE OPERATIONS

DETAILED DESCRIPTIONS

Multiple electronic components in electronic system may be synchronized or orchestrated to perform a single unified function. For example, a gaming console component may manage RGB camera capture, infrared (IR) laser operation, IR sensor operation, microphone operation, interrupt handling (e.g., for receiving input from a gaming controller), communications with a gaming console, etc. Other non-gaming electronic systems may also benefit from such synchronization. However, synchronization of various operations may be designed and set at manufacturing and release of the electronic system, only to become outdated as new system functionality is introduced through addition of new software or component functionality and objectives.

In an implementation of the described technology, a system includes one or more operational circuit blocks, with each operational circuit block being associated with at least one configurable counter circuit associated with at least one operation of the operational circuit block. The configurable counter circuit is configured to issue a control event signal when counting expires and includes a mode input configured to receive a setting of a programmable control event asynchronous mode and a programmable control event synchronous mode. One or more processor units control synchronization of the one or more operational circuit blocks by programming a configurable counter circuit to cause an operational circuit block to process the operation of the operational circuit block after expiration of a synchronization period, if the configurable counter circuit associated with the operation is set for a programmable control event asynchronous mode and the associated configurable counter circuit issued a control event signal during the synchronization period. The one or more processor units may also delay processing of the operation of the operational circuit block until issuance of a new control event signal after the synchronization period if the associated configurable counter circuit is set for a programmable control event synchronous mode or if the associated configurable counter circuit is set for the programmable control event asynchronous mode and the associated configurable counter circuit has not issued a control event signal during the synchronization period.

In another implementation, a system includes operational circuit blocks associated with configurable counter circuits. A configurable counter circuit is configured to process or issue a control event signal when counting expires and includes a mode input configured to receive a setting of a programmable control event asynchronous mode and a programmable control event synchronous mode. Depending on the programmed mode and whether a control event has occurred in a previous synchronization period, the configurable counter circuit processes an associated operation responsive to issuance of a synchronization instruction or to processing or issuance of a subsequent control event.

Multiple operations of an electronic system can be synchronized via a variety of synchronization modes. In one implementation, referred to as "external signal mode," each operational component of the electronic system can send a signal to indicate completion of an operation performed by that component. In another implementation, referred to as "external counter based mode," one or more processor units (e.g., microprocessor units or cores) can start an external counter and then synchronization of the multiple operation waits for the counter to expire before sending a completion signal. In yet another implementation, performance of an operation of a component is delayed until the external counter expires. The completion signal in such implementations may be output as a synchronization signal to other components.

It should be noted that, in one implementation, the "counting" feature of a configurable counter circuit may be omitted, such as when an external "control event" signal is received and/or processed by the configurable circuit from an external source. Such a configurable circuit may nevertheless be synchronized according to a synchronization instruction and be subject to configuration in a programmable control event synchronous mode or a programmable control event asynchronous mode, in accordance with the described technology. Such configurable circuits may not include inputs for a freeze signal or an autorestart signal, as control events are managed by the external source.

Figure 1:
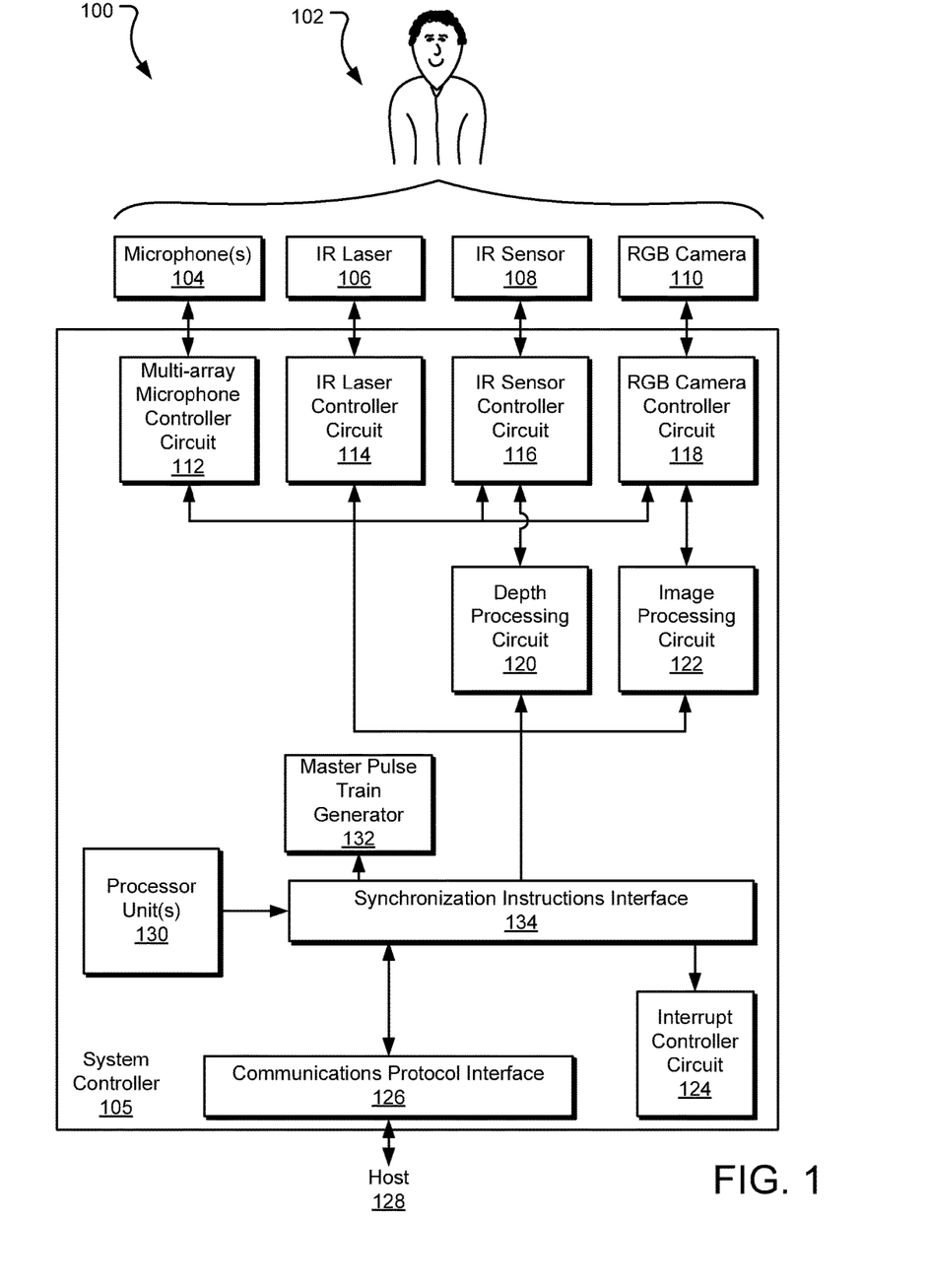
FIG. 1 illustrates an example electronic system for providing configurable synchronized processing of multiple operations.

FIG. 1 illustrates an example electronic system 100 for providing configurable synchronized processing of multiple operations. In FIG. 1, the electronic system 100 represents a component of a gaming system. In an example operational scenario, a user 102 is positioned in front of the electronic system 100, which captures relevant information about the user 102 using various user interface components, including without limitation one or more microphones 104, an IR laser 106, an IR sensor 108, and an RGB camera 110. The one or more microphones 104 capture audio from the gaming environment in which the user 102 is positioned (e.g., to allow voice capture). The IR laser 106 illuminates the gaming environment in which the user 102 is positioned and allows the IR sensor 108 to capture three-dimensional data of the gaming environment, including position and features of the user 102. The RGB camera 110 captures images and/or video of the gaming environment in which the user 102 is positioned. Other operational components may be employed in other scenarios.

Each component is communicatively coupled to a system controller 105 (e.g., an integrated circuit or one or more other controller devices) having individual (and/or integrated) controllers for controlling the user interface components. For example, a multi-array microphone controller circuit 112 controls the microphones 104, an IR laser controller 114 controls the IR laser 106, an IR sensor controller circuit 116 controls the IR sensor 108, and an RGB camera controller circuit 118 controls the RGB camera 110. Further, a depth processing circuit 120 interacts with the IR sensor controller circuit 116 to determine the depth of objects in the gaming environment, and an image processing circuit 122 interacts with the RBG camera controller 118 to process images received from the RGB camera 110. Other components of the system controller 105 may include elements such as an interrupt controller circuit 124 and a communications protocol interface 126, the latter of which communicates with a host system 128, such as a gaming console. Other controllers and processing circuits may be employed in various types of electronic systems using the described technology.

Such components within the system controller 105 perform one or more operations using operational circuitry embodying each component. One or more processor (single-core or multi-core) units 130 within the system controller 105 coordinate the various operations provided by the system components, synchronizing the operations to perform desired functionality (e.g., user interface operations in reference to the user 102). The processor units 130 execute programmable instructions (e.g., software or firmware) stored in one or more tangible storage medium, as opposed to a carrier wave absent a storage medium (e.g., in a vacuum), to perform or cause to be performed operations providing the functionality of the system controller 105 and the electronic system 100. For example, the processor units 130 may send and receive data and instructions to and from the various controller components (e.g., 112, 114, 116, and 118), the depth processing circuit 120, the image processing circuit 122, the interrupt controller circuit 124, and the communications protocol interface 126 to provide appropriate functionality.

Furthermore, the processor units 130 (e.g., microprocessor units or cores) execute programmable instructions for synchronizing the operations of the various components of the system controller 105. Some components may be considered more real-time in nature while others may be considered more event driven, and the nature of such components can change with time, according to different operating scenarios and programming changes. Accordingly, the components may be configured and re-configured via programming instructions executed by the processor units 130. For example, during image capture by the RGB camera 110, the RGB camera controller circuit 118 may operate in a more real-time fashion (e.g., as synchronized relative to a real-time clock). In contrast, communications via the communications protocol interface 126 may require a less than real-time operation and therefore may be processed on a less frequent and/or periodic basis. As such, the processor units 130 provide synchronization instructions to one or more configurable counter circuits of certain components during individual synchronization periods to configure the synchronization of each component. As needs change, the processor units 130 can provide different synchronization instructions to the one or more configurable counter circuits of certain components during individual synchronization periods to reconfigure the synchronization of each component. In various implementations, this reconfigurability of synchronization parameters of individual components provides flexibility of synchronized processing during operation and allows changes in synchronized processing after the electronic system 100 has been manufactured and sold.

In one implementation, certain individual components of the system controller 105 are synchronized with a master pulse train generated by a master pulse train generator 132, which can be programmed to generate master pulses in various programmable patterns (e.g., as programmed by the processor units 130) from which synchronized slave pulses can be derived to drive each component.

In another implementation, certain individual components of the system controller 105 are synchronized in accordance with a wait-for-sync instruction issued by the processor units 130 and with synchronization programming instructions issued to one or more configurable counter circuits in each component. The wait-for-sync instruction may be referred to as a "synchronization instruction" and may designate one or more configurable counter circuits that are expected to perform responsive to a particular synchronization instruction. Even one or more of the processor units 130 may include one or more such configurable counter circuits to control its own operation or the operation of individual components of the system controller 105. In yet another implementation, each component may configure and/or reconfigure the parameters under which one or more of its counters are operating.

In one implementation, the processor units 130 issues synchronization instructions and configures individual configurable counter circuits via a synchronization instructions interface 134, although in other implementations, such instructions and configuration may be performed directly from the processor units 130. The synchronization instructions interface 134 formats and directs configuration instructions to the appropriate target components and communicates the wait-for-sync synchronization instruction to the appropriate target components. The configurable counter circuits of each components are thus configured for synchronization on an individual basis for one or more synchronization periods.

Figure 2:
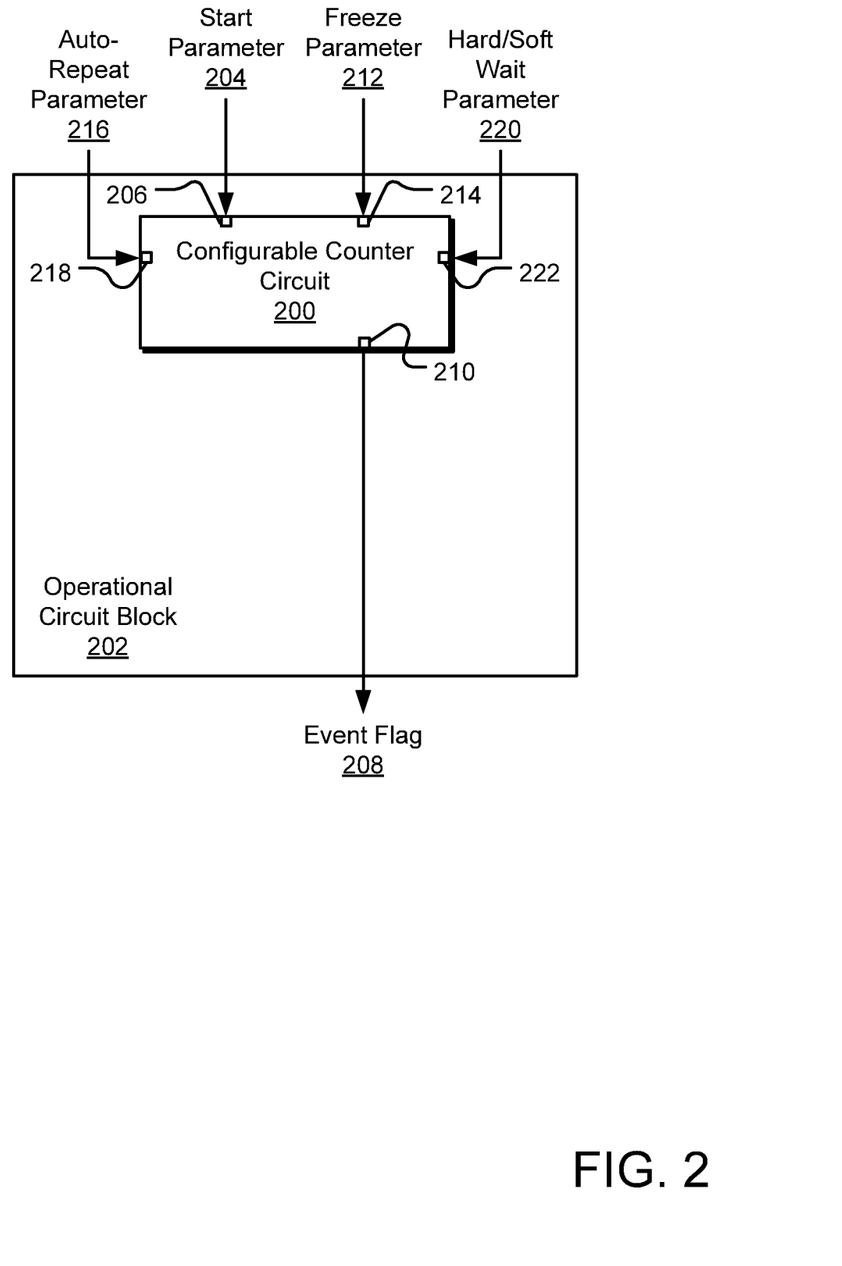
FIG. 2 illustrates an example configurable counter circuit of an operation circuit block useful in providing configurable synchronized processing of multiple operations.

FIG. 2 illustrates an example configurable counter circuit 200 of an operation circuit block 202 useful in providing configurable synchronized processing of multiple operations. The configurable counter circuit 200 includes multiple inputs to receive configurable synchronization parameters and an output to provide an event flag (e.g., an "operation completion signal").

A start parameter 204 may be received via a start parameter input 206 (e.g., from a processor unit or from a parameter source internal to the operation circuit block) to start the configurable counter circuit 200 counting to a preset (although configurable) value or to re-start the counter if the configurable counter circuit 200 has not yet expired. When the configurable counter circuit 200 expires, the configurable counter circuit 200 issues a control event signal, which is some implementations can cause an event flag 208 to be issue via an event flag output 210.

A freeze parameter 212 may be received via a freeze parameter input 214 (e.g., from a processor unit or from a parameter source internal to the operation circuit block) to stop the configurable counter circuit 200 from counting if the configurable counter circuit has not yet expired. A "frozen" configurable counter circuit 200 may be restarted by receipt of a start parameter 204 without starting the count over.

An autorestart parameter 216 may be received via an autorestart parameter input 218 (e.g., from a processor unit or from a parameter source internal to the operation circuit block) to cause the configurable counter circuit 200 to automatically restart counting after expiration, without a new receipt of a start parameter 204. In one implementation, the autorestart parameter 216 allows continuous, automatic initiation of the configurable counter circuit 200 without firmware intervention and allows for a "heartbeat" type sync event.

A hard/soft wait parameter 220 may be received via a wait parameter input 222 (e.g., from a processor unit or from a parameter source internal to the operation circuit block) to cause the configurable counter circuit 200 to operating in a programmable control event asynchronous mode or a programmable control event synchronous mode. These modes are described in more detail in Table 1.

TABLE 1

Hard/Soft Wait Parameters

| Hard/Soft Wait Parameter | Event flag was set at wait-for-sync instruction receipt | Event flag was not set at wait-for-sync instruction receipt |
| --- | --- | --- |
| Hardwait | Clear the event flag Delay operation until new control event is received | Delay operation until new control event is received |
| Softwait | Clear the event flag Perform operation | Delay operation until new control event is received |

Figure 3:
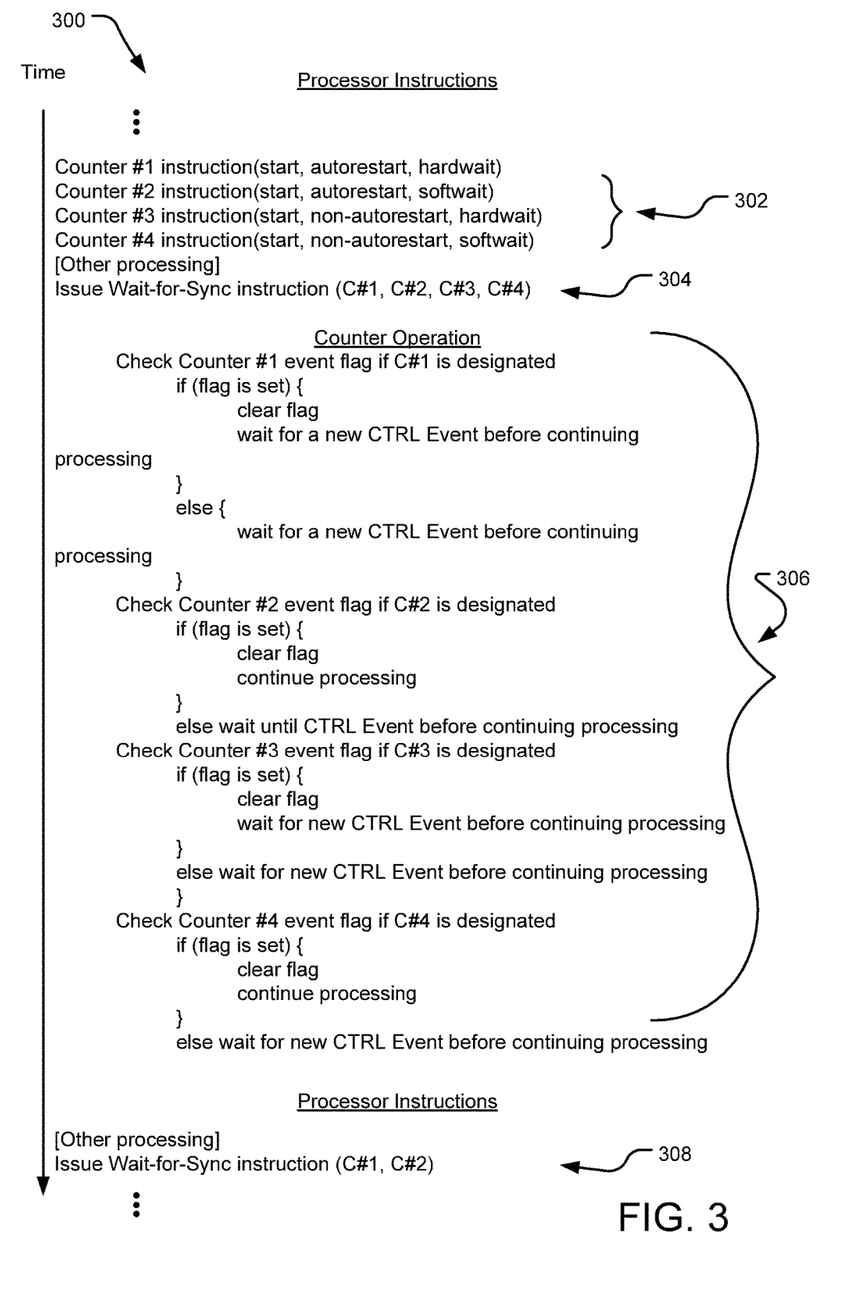
FIG. 3 illustrates descriptions of example processor instructions in an environment providing configurable synchronized processing of multiple operations.

FIG. 3 illustrates descriptions of example descriptive instructions 300 in an environment providing configurable synchronized processing of multiple operations. The vertical axis represents the system processing over time, from the top of the listing to the bottom. It should be understood that processor instructions may precede and/or follow those listed in the processor instructions, and the listed processor instructions are provided only as example descriptions. The example instructions of FIG. 3 are intended to be descriptive and are not intended to represent any specific programming language or signaling format, as the described technology may be implemented in many forms and may operate in a variety of environments. Furthermore, in some implementations in which an external event is received from an external source, the counter functionality of a configurable counter circuit in a configurable circuit that responds to synchronization instructions and supports event synchronous/asynchronous modes.

The example descriptive instructions 300 represent instructions directed to four different counters in an electronic system. The set 302 of processor instructions sets the synchronization configurations of the four counters, wherein:

Counter #1 instruction(start, autorestart, hardwait)—
Counter #1 receives the start, autorestart and hardwait parameters. The counter starts and will autorestart at expiration. The wait mode is set to a programmable control event synchronous mode.

Counter #2 instruction(start, autorestart, softwait)—
Counter #2 receives the start, autorestart and softwait parameters. The counter starts and will autorestart at expiration. The wait mode is set to a programmable control event asynchronous mode.

Counter #3 instruction(start, non-autorestart, hardwait)—
Counter #3 receives the start, non-autorestart and hardwait parameters. The counter starts but will not autorestart at expiration. The wait mode is set to a programmable control event synchronous mode.

Counter #4 instruction(start, non-autorestart, softwait)—
Counter #4 receives the start, non-autorestart and softwait parameters. The counter starts but will not autorestart at expiration. The wait mode is set to a programmable control event asynchronous mode.

The "Issue Wait-for-Sync instruction" processor instruction 304 causes issuance of a synchronization instruction to select system components (e.g., in this case, to Counters #1, #2, #3, and #4). In one implementation, receipt of a Wait-for-Sync instruction at a configurable counter circuit also resets the event flag. The period between receipts of synchronization instructions is referred to as a "synchronization period."

The descriptive text 306 describes how the processor instructions 302 are handled by the individual configurable counter circuits (i.e., Counters #1-#4) according to the synchronization parameters received by each configurable counter circuit. Such processing is consistent with the information in Table 1 and is further described with reference to FIGS. 4-6. The operations in the descriptive text 306 may happen concurrently among each of the counters. It should also be understood that each processor can instruct one or more counter circuits individually or in sub-groups.

Counter #1, which is set for a hard wait and autorestart, checks the event flag. If the event flag is set, then the Counter #1 clears the event flag and delays processing of the operation associated with the Counter #1 until a new CTR Event is detected, at which point, the operation processing continues. If the event flag is not set, Counter #1 delays processing of the operation associated with the Counter #1 until a new CTR Event is detected, at which point, the operation processing continues. Because the Counter #1 is set for autorestart, the Counter #1 is already re-counting and will issue a CTR event when the Counter #1 expires.

Counter #2, which is set for a soft wait and autorestart, checks the event flag. If the event flag is set, then the Counter #2 clears the event flag and continues processing the operation associated with the Counter #2 right away. If the event flag is not set, Counter #2 delays processing of the operation associated with the Counter #2 until a new CTR Event is detected, at which point, the operation processing continues. Because the Counter #2 is set for autorestart, the Counter #2 is already re-counting and will issue a CTR event when the Counter #2 expires.

Counter #3, which is set for a hard wait and autorestart, checks the event flag. If the event flag is set, then the Counter #3 clears the event flag and delays processing of the operation associated with the Counter #3 until a new CTR Event is detected, at which point, the operation processing continues. If the event flag is not set, Counter #3 delays processing of the operation associated with the Counter #3 until a new CTR Event is detected, at which point, the operation processing continues. Because the Counter #3 is set for non-autorestart, the Counter #3 has not already started re-counting, so the Counter #3 will be restarted via a processor instruction, after which it will issue a CTR event when the Counter #3 expires.

Counter #2, which is set for a soft wait and autorestart, checks the event flag. If the event flag is set, then the Counter #2 clears the event flag and continues processing the operation associated with the Counter #2 right away. If the event flag is not set, Counter #2 delays processing of the operation associated with the Counter #2 until a new CTR Event is detected, at which point, the operation processing continues. Because the Counter #4 is set for non-autorestart, the Counter #4 has not already started re-counting, so the Counter #4 will be restarted via a processor instruction, after which it will issue a CTR event when the Counter #4 expires.

Other processor instructions may be processed during or after the counter operations, including another issuance of a Wait-for-Sync instruction 308, which terminates the synchronization period and starts the next synchronization period for Counters #1 and #2. Note: The synchronization periods for Counters #3 and #4 may continue, in this example, until one or more synchronization instructions designating each of them is issued.

Figure 4:
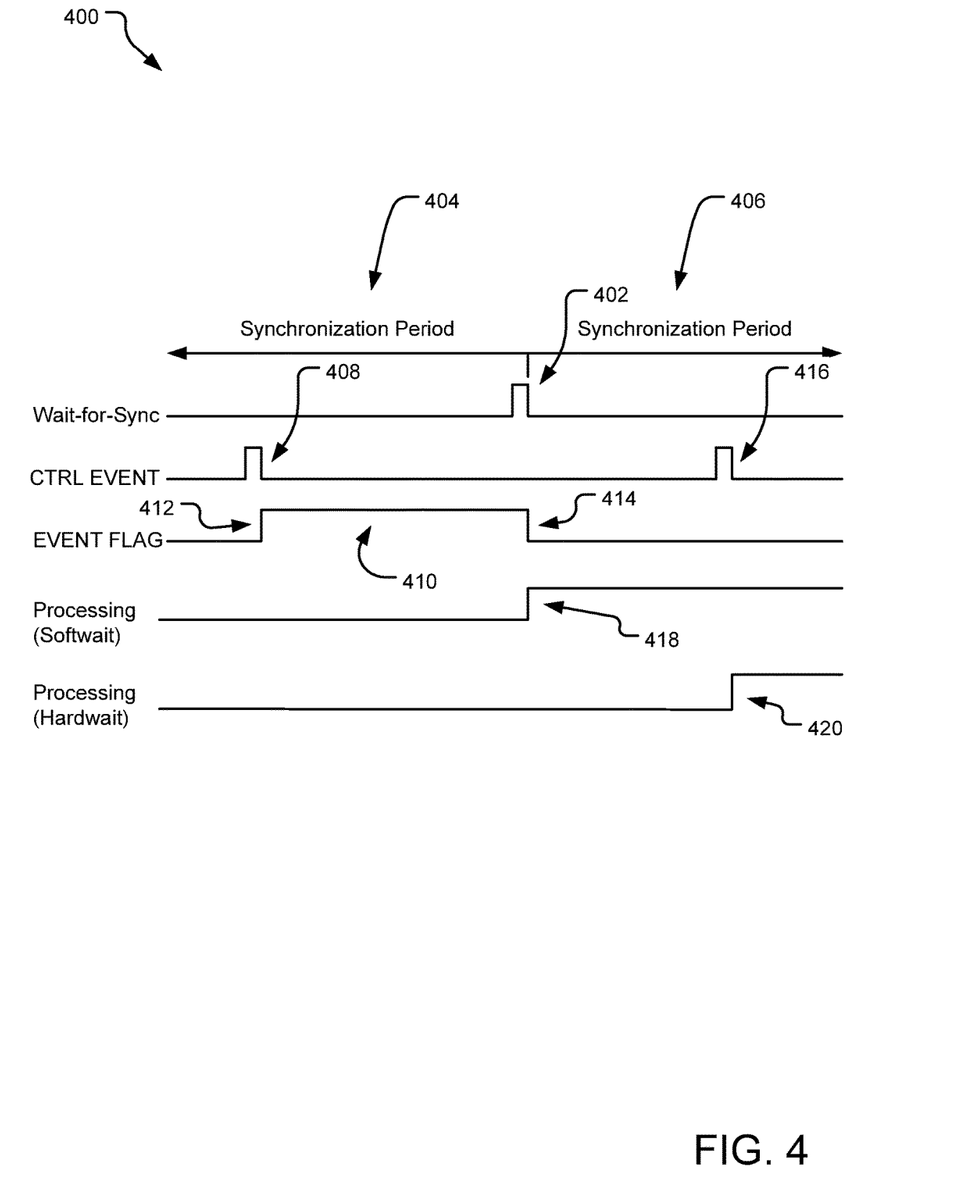
FIG. 4 illustrates example signals and processing based on configurable synchronized processing based on an autorestart mode.

FIG. 4 illustrates example signals and processing (collectively, 400) based on configurable synchronized processing based on an autorestart mode. A microprocessor issues a synchronization signal (e.g., wait-for-sync pulse 402), which ends one synchronization period 404 and starts another synchronization period 406. In the example of FIG. 4, a control event 408 (CTR EVENT), indicating the expiration of the counter, occurs, causing the raising of the event flag 410 at point 412. The event flag 410 is reset responsive to the synchronization signal 402 at point 414. Because the counter is configured with an autorestart parameter, the counter restarts at the control event 408, issuing another control event 416 when the counter expires.

In the case of the softwait processing, the operation continues processing at point 418 when the event flag 410 is reset. This scenario synchronizes the operation processing with the synchronization signal 402, assuming the counter flag 410 was set in the previous synchronization period 404.

In the case of hardwait processing, the operation continues processing at point 420, delayed after detection of the synchronization signal 402 until a new control event occurs (i.e., control event 416). This scenario synchronizes the operation processing with the next control event (rather than the synchronization signal 402), assuming the counter flag 410 was set in the previous synchronization period 404.

Figure 5:
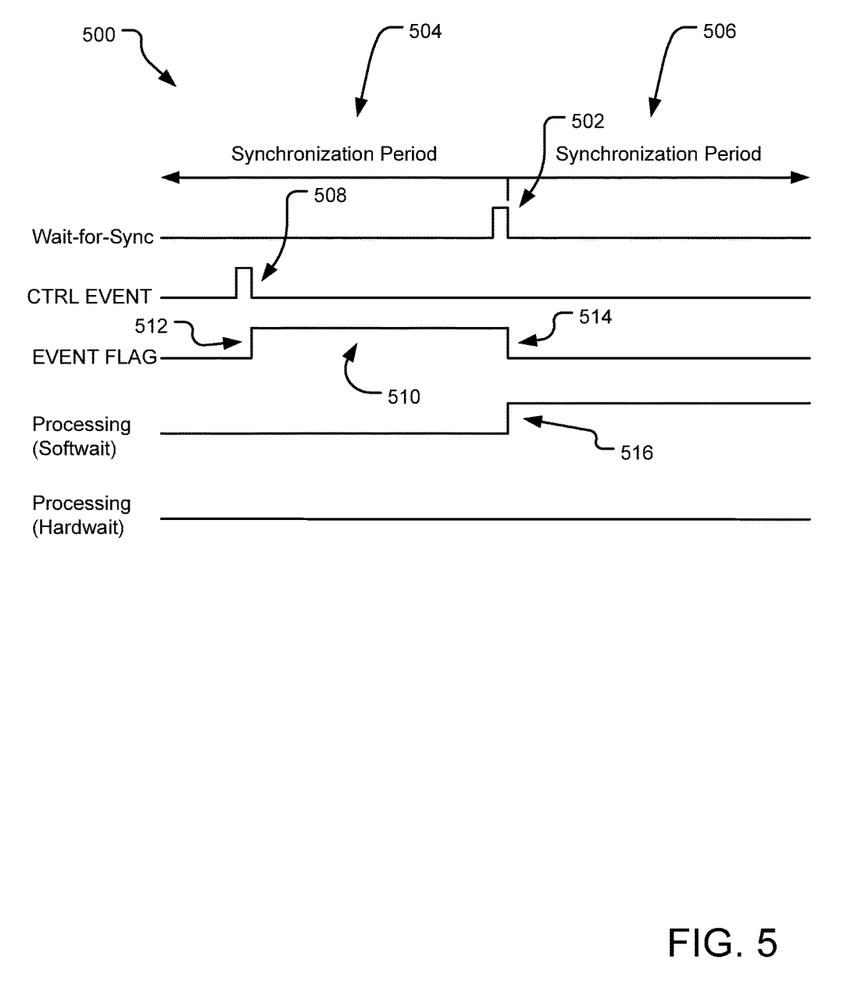
FIG. 5 illustrates example signals and processing based on configurable synchronized processing based on a non-autorestart mode when a control event has occurred during a synchronization period.

FIG. 5 illustrates example signals and processing (collectively, 500) based on configurable synchronized processing based on a non-autorestart mode when a control event has occurred during a synchronization period. A microprocessor issues a synchronization signal (e.g., wait-for-sync pulse 502), which ends one synchronization period 504 and starts another synchronization period 506. In the example of FIG. 5, a control event 508 (CTR EVENT), indicating the expiration of the counter, occurs, causing the raising of the event flag 510 at point 512. The event flag 510 is reset responsive to the synchronization signal 502 at point 514. Because the counter is configured with a non-autorestart parameter, the counter does not automatically restart, awaiting a synchronization instruction from the processor to restart the counter.

In the case of the softwait processing, the operation continues processing at point 516 when the event flag 510 is reset. This scenario synchronizes the operation processing with the synchronization signal 502, assuming the counter flag 510 was set in the previous synchronization period 504.

In the case of hardwait processing, the operation does not continue processing but is instead delayed after detection of the synchronization signal 502 until a new control event occurs (not shown in the time illustrated in FIG. 5). This scenario synchronizes the operation processing with the next control event (rather than the synchronization signal 502), assuming the counter flag 510 was set in the previous synchronization period 504.

Figure 6:
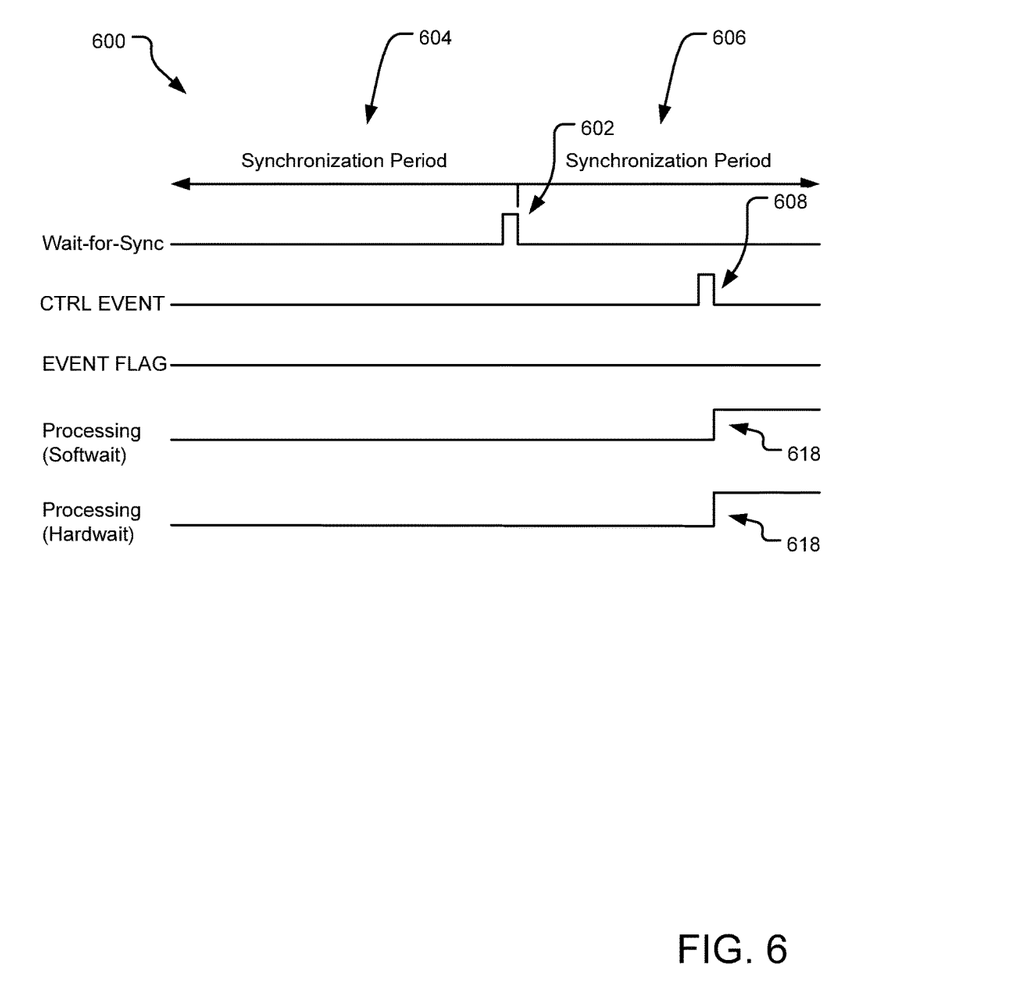
FIG. 6 illustrates example signals and processing based on configurable synchronized processing based on a non-autorestart mode when a control event has not yet occurred during a synchronization period.

FIG. 6 illustrates example signals and processing (collectively, 600) based on configurable synchronized processing based on a non-autorestart mode when a control event has not yet occurred during a synchronization period. A microprocessor issues a synchronization signal (e.g., wait-for-sync pulse 602), which ends one synchronization period 604 and starts another synchronization period 606. In the example of FIG. 6, a control event 608 (CTR EVENT), indicating the expiration of the counter, occurs. Because the counter is configured with a non-autorestart parameter, the counter does not automatically restarts, awaiting a synchronization instruction from the processor to restart the counter.

In the case of both softwait and hardwait processing, the operation continues processing at point 618 when the control event 608 is detected, rather than when the synchronization instruction 602 is received, because the event flag was not set in the previous synchronization period 604. This scenario synchronizes the operation processing in both modes with the counter flag 608, assuming the counter flag 610 was not set in the previous synchronization period 604.

Figure 7:
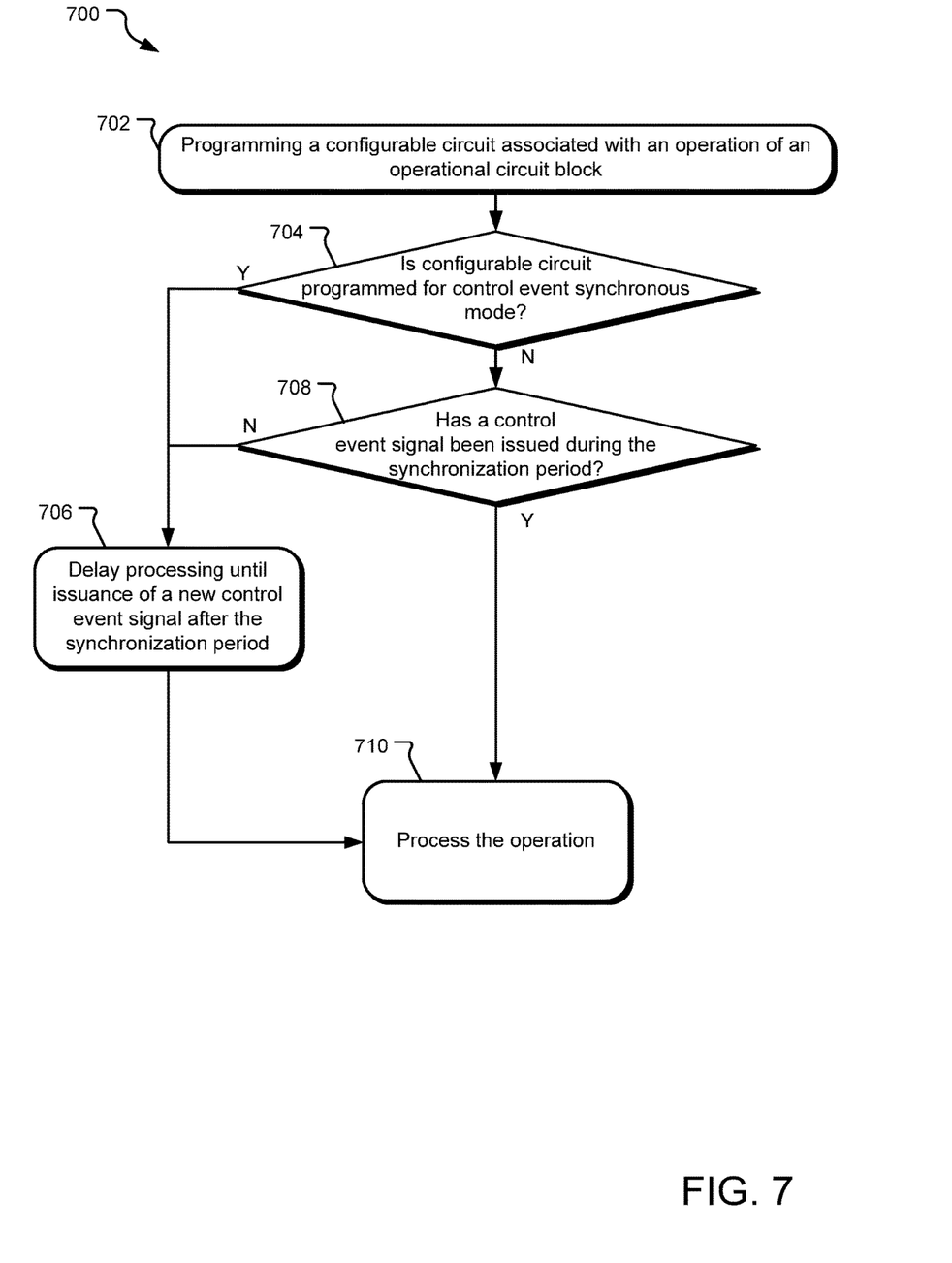
FIG. 7 illustrates example operations for configurable synchronization of multiple operations for an electronic device.

FIG. 7 illustrates example operations 700 for configurable synchronization of multiple operations for an electronic device. A programming operation 702 programs a configurable circuit associated with an operation of an operational circuit block. A decision operation 704 determines whether the configurable circuit is programmed for control event synchronous mode (e.g., hardwait). If so, a delay operation 706 delays operation until issuance of a new control event signal after the synchronization period, and a processing operation 710 processes the operation responsive to issuance of the new control event signal.

If the decision operation 704 determines that the configurable circuit is programmed for a control event asynchronous mode (e.g., softwait), then another decision operation 708 determines whether a control event signal was issued during the previous synchronization period. If not, the delay operation 706 delays operation until issuance of a new control event signal after the synchronization period. If the decision operation 708 determines that the control event signal was issued during the previous synchronization period, then the processing operation 710 processes the operation at the start of the current synchronization period.

In one implementation, a first example method is provided including programming one or more configurable counter circuits, wherein each configurable counter circuit controls processing of at least one operation in an operational circuit block during a synchronization period. At least one operation of a operational circuit block is processed after expiration of the synchronization period, if a configurable counter circuit associated with the at least one operation is set for a programmable control event asynchronous mode and the associated configurable counter circuit issued a control event signal during the synchronization period. The processing of the at least one operation of the operational circuit block is delayed until issuance of a new control event signal after the synchronization period, if the associated configurable counter circuit is set for a programmable control event synchronous mode or if the associated configurable counter circuit is set for the programmable control event asynchronous mode and the associated configurable counter circuit has not issued a control event signal during the synchronization period.

In another implementation, a second example method includes the second example method wherein each of the one or more configurable counter circuits supports a programmable control event synchronous mode and a programmable control event asynchronous mode.

In another implementation, a third example method includes any previous example method and further includes processing the at least one operation of the operational circuit block during the synchronization period until the associated configurable counter circuit expires and issues the control event signal.

In another implementation, a fourth example method includes any previous example method and further includes stopping processing of the at least one operation of the operational circuit block during the synchronization period without resetting counting by the associated configurable counter circuit, responsive to receipt of a freeze signal by the associated configurable counter circuit.

In another implementation, a fifth example method includes any previous example method and further includes restarting processing of the at least one operation of the operational circuit block during the synchronization period without resetting counting by the associated configurable counter circuit, responsive to removal of a freeze signal from the associated configurable counter circuit.

In another implementation, a sixth example method further includes restarting counting by the associated configurable counter circuit after expiration without receiving a start signal.

In another implementation, an example circuit block a configurable counter circuit associated with at least one operation of the circuit, wherein the configurable counter circuit is configured to issue a control event signal when counting expires and including a mode input configured to receive a setting of a programmable control event asynchronous mode and a programmable control event synchronous mode. Operational circuitry is operable to process the at least one operation of the circuit after expiration of a synchronization period, if the configurable counter circuit associated with the at least one operation is set for a programmable control event asynchronous mode and the associated configurable counter circuit issued a control event signal during the synchronization period. The operational circuitry further delays processing of the at least one operation of the circuit until issuance of a new control event signal after the synchronization period if the associated configurable counter circuit is set for a programmable control event synchronous mode or if the associated configurable counter circuit is set for the programmable control event asynchronous mode and the associated configurable counter circuit has not issued a control event signal during the synchronization period.

In another implementation, a second example circuit includes the circuit and the operational circuitry processes the at least one operation of the circuit during the synchronization period until the associated configurable counter circuit issues the control event signal.

In another implementation, a third example circuit includes any previous circuit, the configurable counter circuit includes a freeze signal input, and the operational circuitry stops processing of the at least one operation of the circuit during the synchronization period without resetting counting by the associated configurable counter circuit, responsive to receipt of the freeze signal by the associated configurable counter circuit.

In another implementation, a fourth example circuit includes any previous circuit and the operational circuitry restarts processing of the at least one operation of the operational circuitry during the synchronization period without resetting counting by the associated configurable counter circuit, responsive to removal of the freeze signal from the associated configurable counter circuit.

In another implementation, a fourth example circuit includes any previous circuit, the associated configurable counter circuit includes an autorepeat signal input, and the operational circuitry restarts counting by the associated configurable counter circuit after expiration without receiving a start signal, responsive to receipt of an autorepeat signal via the autorepeat signal input.

In another implementation, an example system includes one or more circuits. Each operational circuit block is associated with at least one configurable circuit associated with at least one operation of the operational circuit block. the configurable circuit being configured to process a control event signal and including a mode input configured to receive a setting of a programmable control event asynchronous mode and a programmable control event synchronous mode. One or more processor units is operable to control synchronization of the one or more operational circuit blocks by programming the at least one configurable circuit to cause the operational circuit block to process the at least one operation of the operational circuit block after expiration of a synchronization period, if the configurable circuit associated with the at least one operation is set for a programmable control event asynchronous mode and the associated configurable circuit processed a control event signal during the synchronization period. The one or more processor units further control synchronization of the one or more operational circuit blocks by programming the at least one configurable circuit to cause the operational circuit cause the operational circuit block to delay processing of the at least one operation of the operational circuit block until processing of a new control event signal after the synchronization period if the associated configurable circuit is set for a programmable control event synchronous mode or if the associated configurable circuit is set for the programmable control event asynchronous mode and the associated configurable circuit has not processed a control event signal during the synchronization period.

In another implementation, a second example system includes the first example system wherein each operational circuit block further processes the at least one operation during the synchronization period until the associated configurable circuit processes the control event signal.

In another implementation, a third example system includes any previous example system wherein the configurable circuit includes a configurable counter circuit including a freeze signal input and the operational circuit block stops processing of the at least one operation of the operational circuit block during the synchronization period without resetting counting by the configurable counter circuit, responsive to receipt of the freeze signal by the configurable counter circuit.

In another implementation, a fourth example system includes any previous example system, wherein the operational circuitry restarts processing of the at least one operation of the operational circuitry during the synchronization period without resetting counting by the configurable counter circuit, responsive to removal of a freeze signal from the configurable counter circuit.

In another implementation, a fifth example system includes any previous example system, the configurable circuit includes a configurable counter circuit including an autorepeat signal input, and the operational circuitry restarts counting by the configurable counter circuit after expiration without receiving a start signal.

In another implementation, a sixth example system includes any previous example system wherein the configurable circuit includes a configurable counter circuit that processes the control signal by issuing the control signal when a counter of the configurable counter circuit expires.

In another implementation, a seventh example system includes any previous example system wherein the configurable circuit processes the control signal by receiving the control signal from an external source.

In another implementation, a seventh example system includes any previous example system wherein the configurable circuit does not include a counter.

In another implementation, a first example system includes means for programming one or more configurable counter circuits, each configurable counter circuit controlling at least one operation processing in an operational circuit block during a synchronization period. The first example system also include means for processing at least one operation of a operational circuit block after expiration of the synchronization period, if a configurable counter circuit associated with the at least one operation is set for a programmable control event asynchronous mode and the associated configurable counter circuit issued a control event signal during the synchronization period. The first example system also includes means for delaying processing of the at least one operation of the operational circuit block until issuance of a new control event signal after the synchronization period if the associated configurable counter circuit is set for a programmable control event synchronous mode or if the associated configurable counter circuit is set for the programmable control event asynchronous mode and the associated configurable counter circuit has not issued a control event signal during the synchronization period.

In another implementation, a second example system includes the first example system wherein each configurable counter circuit supports a programmable control event synchronous mode and a programmable control event asynchronous mode.

In another implementation, a third example system includes any previous example system and further includes means for processing the at least one operation of the operational circuit block during the synchronization period until the associated configurable counter circuit expires and issues the control event signal.

In another implementation, a fourth example system includes any previous example system and further includes means for stopping processing of the at least one operation of the operational circuit block during the synchronization period without resetting counting by the associated configurable counter circuit, responsive to receipt of the freeze signal by the associated configurable counter circuit.

In another implementation, a fifth example system includes any previous example system and further includes restarting processing of the at least one operation of the operational circuit block during the synchronization period without resetting counting by the associated configurable counter circuit, responsive to removal of the freeze signal from the associated configurable counter circuit.

In another implementation, a sixth example system includes any previous example system and further includes restarting counting by the associated configurable counter circuit after expiration without receiving a start signal.

The implementations of the various embodiments described herein are implemented as logical steps in one or more electronic devices. The logical operations of the presently described technology may be implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed embodiments. Accordingly, the logical operations making up the embodiments described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a description of the structure and use of the disclosed exemplary embodiments. It will be understood that the configurations and/or approaches described herein are exemplary in nature, and that these specific embodiments or examples are not to be considered in a limiting sense, because numerous variations are possible. Since many implementations of the disclosed subject matter can be made without departing from the spirit and scope of the disclosed subject matter, the invention resides in the claims hereinafter appended. Furthermore, structural features of the different embodiments may be combined in yet another implementation without departing from the recited claims.

What is claimed is:

1. A method comprising:
    programming one or more configurable counter circuits, each configurable counter circuit controlling at least one operation processing in an operational circuit block during a sequence of synchronization periods;
    processing at least one operation of the operational circuit block after expiration of a synchronization period of the sequence of synchronization periods responsive to a configurable counter circuit associated with the at least one operation being set for a programmable control event asynchronous mode and the associated configurable counter circuit having issued an instance of a control event signal during the synchronization period; and
    delaying processing of the at least one operation of the operational circuit block until issuance of a new instance of the control event signal after the synchronization period responsive to the associated configurable counter circuit being set for a programmable control event synchronous mode or the associated configurable counter circuit being set for the programmable control event asynchronous mode and the associated configurable counter circuit having not issued the instance of the control event signal during the synchronization period.

2. The method of claim 1 wherein each of the one or more configurable counter circuits supports the programmable control event synchronous mode and the programmable control event asynchronous mode.

3. The method of claim 1 further comprising:
    processing the at least one operation of the operational circuit block during the synchronization period until the associated configurable counter circuit expires and issues the instance of the control event signal.

4. The method of claim 1 wherein each configurable counter circuit supports a freeze signal and further comprising:
    stopping processing of the at least one operation of the operational circuit block during the synchronization period without resetting counting by the associated configurable counter circuit, responsive to receipt of the freeze signal by the associated configurable counter circuit.

5. The method of claim 4 further comprising:
    restarting processing of the at least one operation of the operational circuit block during the synchronization period without resetting counting by the associated configurable counter circuit, responsive to removal of the freeze signal from the associated configurable counter circuit.

6. The method of claim 1 wherein further comprising:
    restarting counting by the associated configurable counter circuit after expiration without receiving a start signal.

7. A circuit comprising:
a configurable counter circuit associated with at least one operation of the circuit, the configurable counter circuit being configured to issue an instance of a control event signal in response to counting expiring and including a mode input configured to receive a setting of a programmable control event asynchronous mode and a programmable control event synchronous mode; and
operational circuitry operable to process the at least one operation of the circuit after expiration of a synchronization period responsive to the configurable counter circuit associated with the at least one operation being set for the programmable control event asynchronous mode and the associated configurable counter circuit issued an instance of the control event signal during the synchronization period and to delay processing of the at least one operation of the circuit until issuance of a new instance of the control event signal after the synchronization period responsive to the associated configurable counter circuit being set for the programmable control event synchronous mode or the associated configurable counter circuit being set for the programmable control event asynchronous mode and the associated configurable counter circuit having not issued the instance of the control event signal during the synchronization period.

8. The circuit of claim 7 wherein the operational circuitry further processes the at least one operation of the circuit during the synchronization period until the associated configurable counter circuit issues the instance of the control event signal.

9. The circuit of claim 7 wherein the associated configurable counter circuit includes a freeze signal input and the operational circuitry stops processing of the at least one operation of the circuit during the synchronization period without resetting counting by the associated configurable counter circuit, responsive to receipt of the freeze signal input by the associated configurable counter circuit.

10. The circuit of claim 7 wherein the operational circuitry restarts processing of the at least one operation of the operational circuitry during the synchronization period without resetting counting by the associated configurable counter circuit, responsive to removal of a freeze signal from the associated configurable counter circuit.

11. The circuit of claim 7 wherein the associated configurable counter circuit includes an autorepeat signal input and the operational circuitry restarts counting by the associated configurable counter circuit after expiration without receiving a start signal, responsive to receipt of an autorepeat signal via the autorepeat signal input.

12. A system comprising:
one or more operational circuit blocks, each operational circuit block being associated with at least one configurable circuit associated with at least one operation of the operational circuit block, the configurable circuit being configured to process an instance of a control event signal and including a mode input configured to receive a setting of a programmable control event asynchronous mode and a programmable control event synchronous mode; and
one or more processor units operable to control synchronization of the one or more operational circuit blocks by programming the at least one configurable circuit to cause the operational circuit block to process the at least one operation of the operational circuit block after expiration of a synchronization period responsive to the configurable circuit associated with the at least one operation being set for the programmable control event asynchronous mode and the associated configurable circuit having processed an instance of the control event signal during the synchronization period and to delay processing of the at least one operation of the operational circuit block until processing of a new instance of the control event signal after the synchronization period responsive to the associated configurable circuit being set for the programmable control event synchronous mode or the associated configurable circuit being set for the programmable control event asynchronous mode and the associated configurable circuit having not processed the instance of the control event signal during the synchronization period.

13. The system of claim 12 wherein each operational circuit block further processes the at least one operation during the synchronization period until the associated configurable circuit processes the instance of the control event signal.

14. The system of claim 13 wherein the configurable circuit includes a configurable counter circuit including a freeze signal input, and the operational circuit block stops processing of the at least one operation of the operational circuit block during the synchronization period without resetting counting by the configurable counter circuit, responsive to receipt of the freeze signal input by the configurable counter circuit.

15. The system of claim 14 wherein the operational circuit block restarts processing of the at least one operation of the operational circuit block during the synchronization period without resetting counting by the configurable counter circuit, responsive to removal of the freeze signal from the configurable counter circuit.

16. The system of claim 13 wherein the configurable circuit includes a configurable counter circuit including an autorepeat signal input and the operational circuit block restarts counting by the configurable counter circuit after expiration without receiving a start signal via the autorepeat signal input.

17. The system of claim 12 wherein the configurable circuit includes a configurable counter circuit that processes the control signal by issuing the control signal when a counter of the configurable counter circuit expires.

18. The system of claim 12 wherein the configurable circuit processes the control signal by receiving the control signal from an external source.

19. The system of claim 12 wherein the configurable circuit does not include a counter.

* * * * *